April 1, 1941.  G. O. TAYLOR ET AL  2,236,784
GEAR CASE FLUSHER
Filed July 1, 1938  5 Sheets-Sheet 5
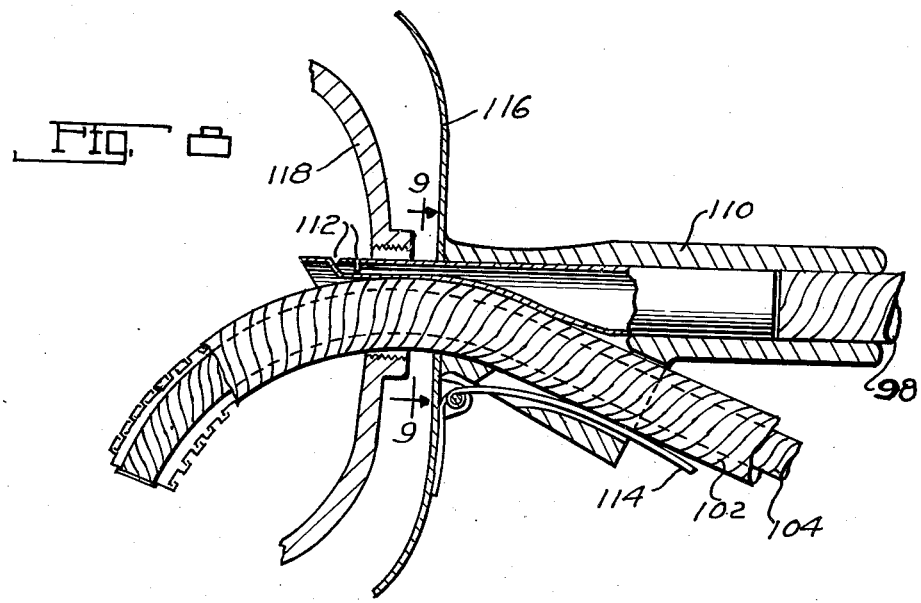
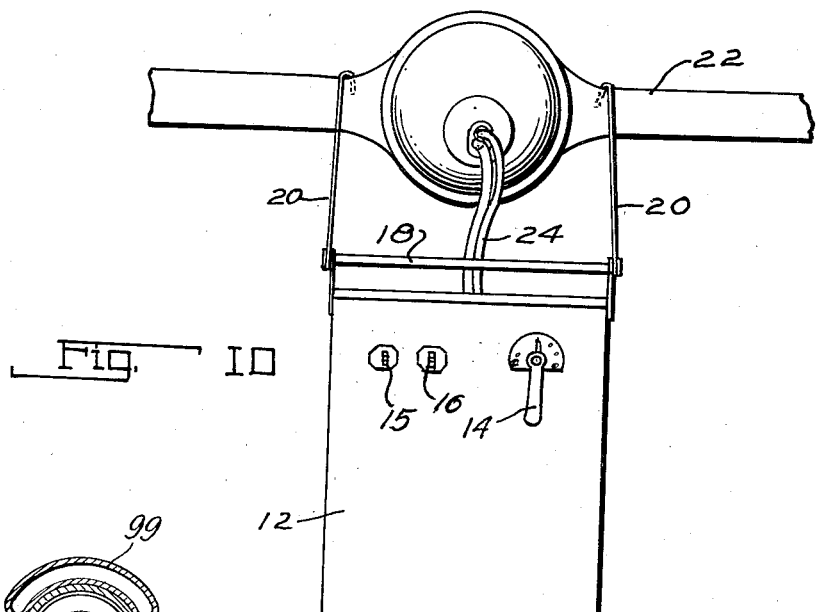
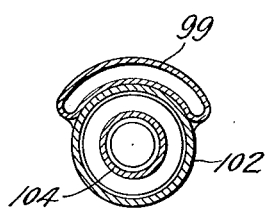
INVENTORS:
GEORGE O. TAYLOR,
BY ERNEST V. BUNTING,
McConkey Dawson & Booth,
ATTORNEYS.

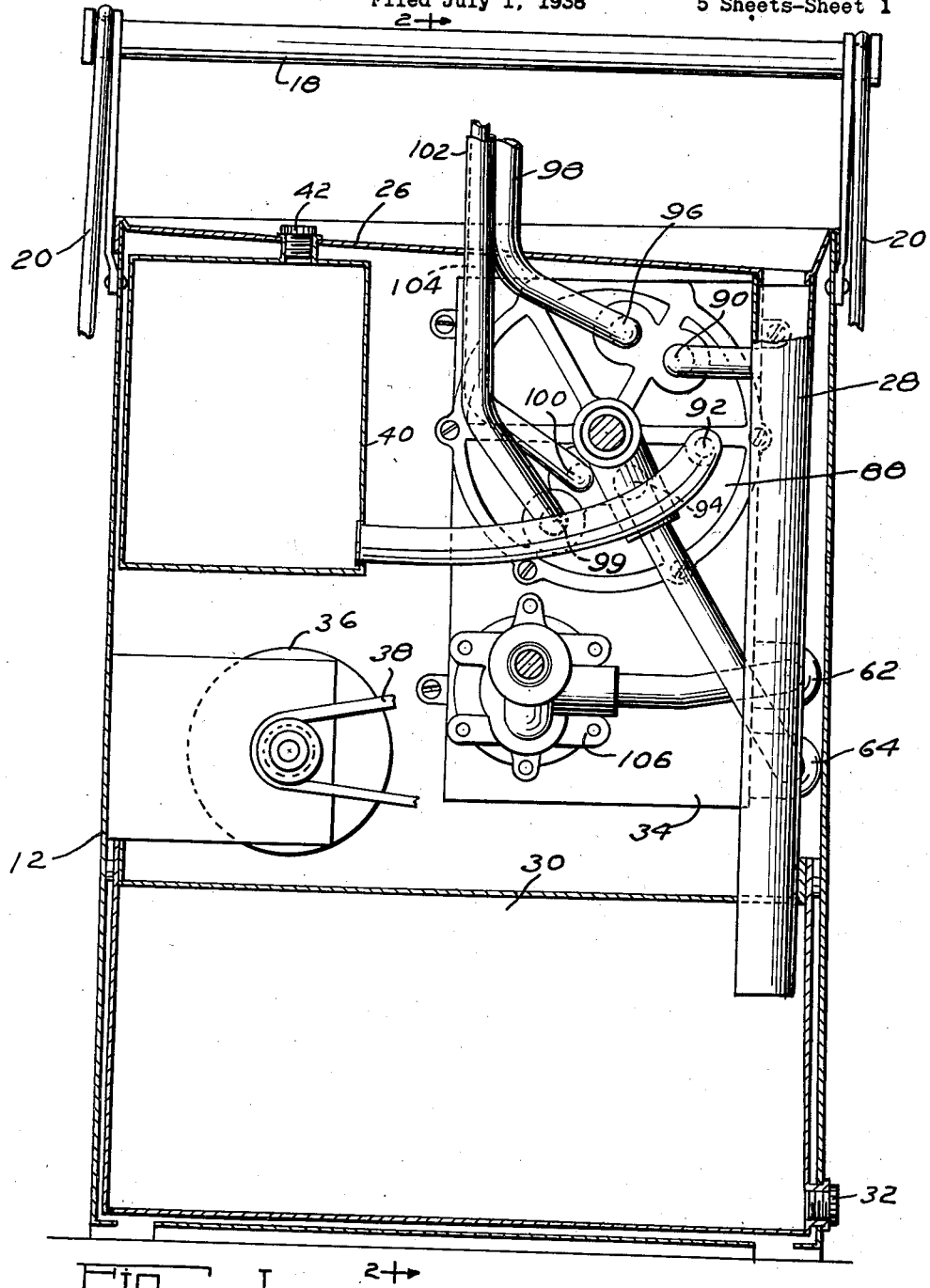

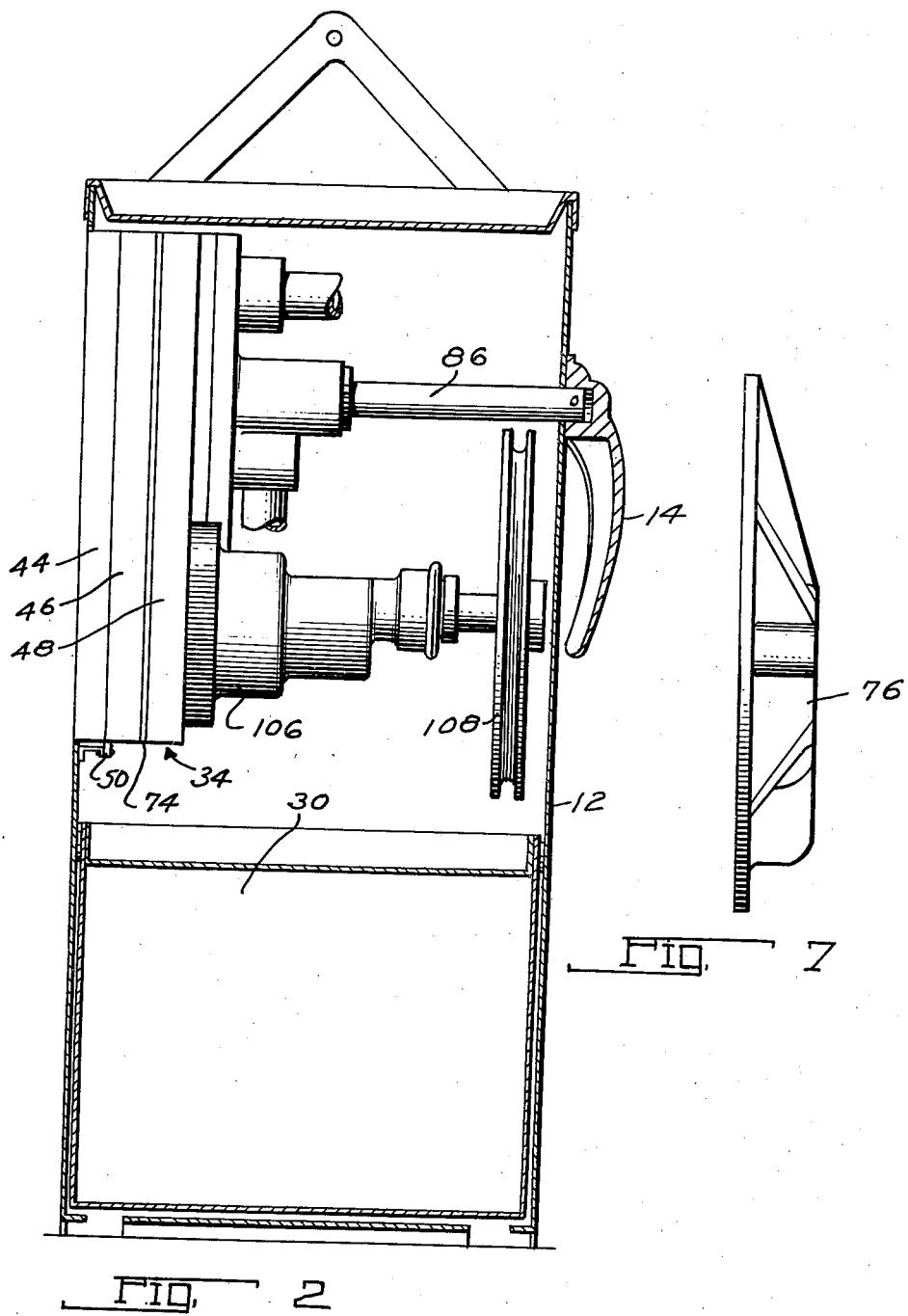

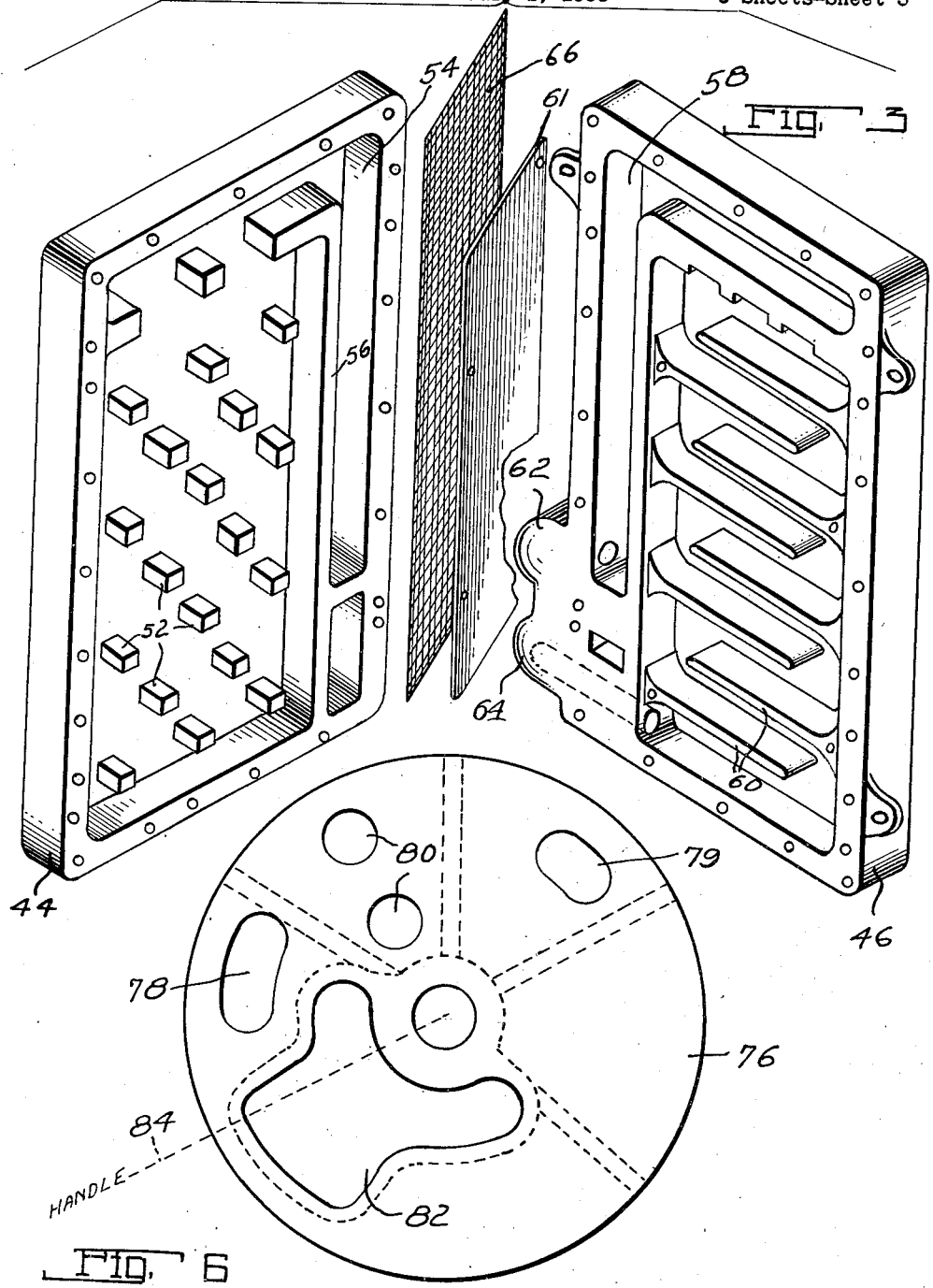

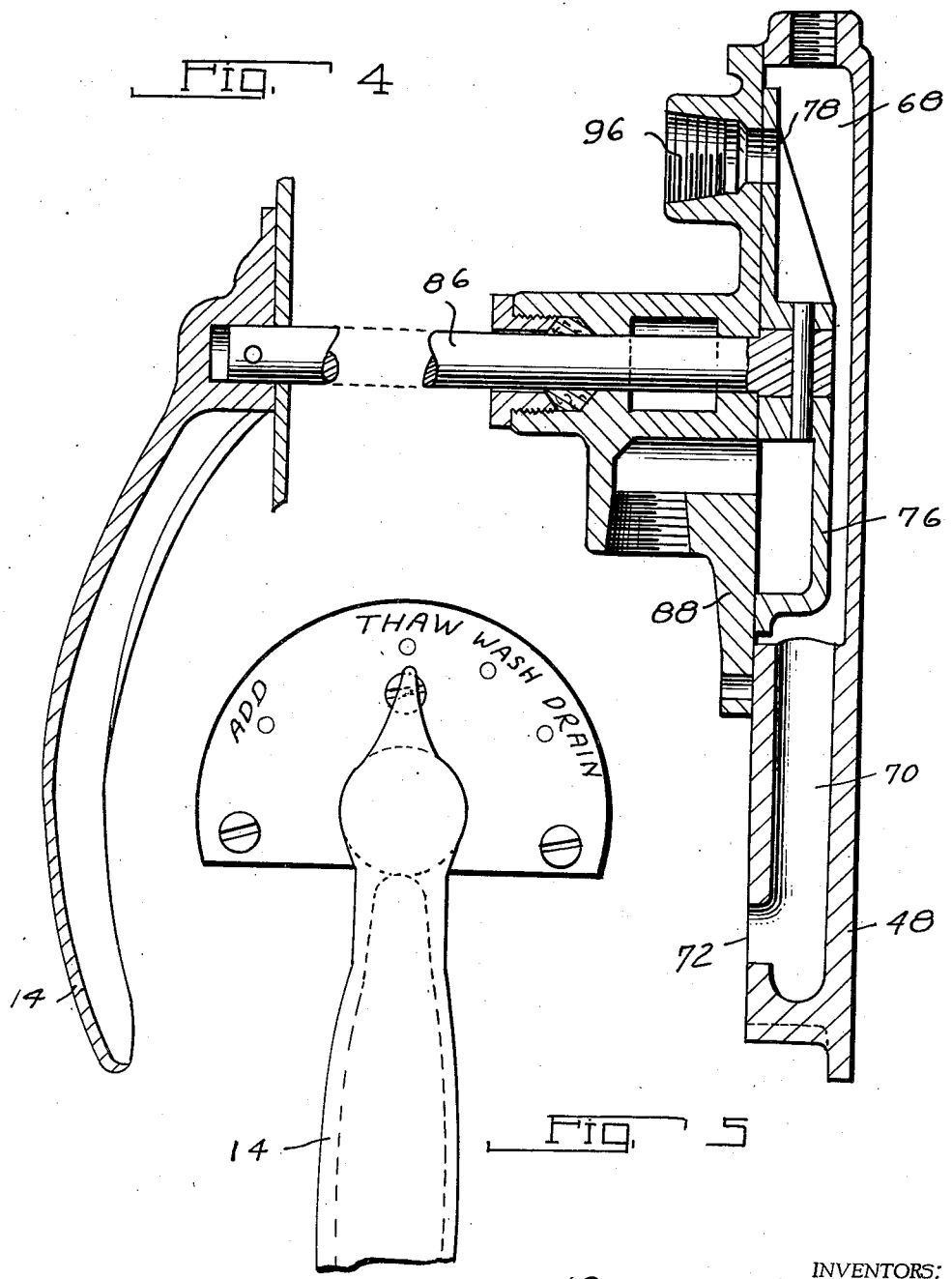

Patented Apr. 1, 1941

2,236,784

UNITED STATES PATENT OFFICE 2,236,784

GEAR CASE FLUSHER

George O. Taylor, Cicero, and Ernest V. Bunting, Chicago, Ill., assignors, by mesne assignments, to Stewart-Warner Corporation, Chicago, Ill., a corporation of Virginia Application July 1, 1938, Serial No. 216,970

14 Claims. (Cl. 184—1.5)

This invention relates to gear case flushers and more particularly to devices for flushing or cleaning differential or transmission gears or the like.

In the operation of automobiles the grease used in the differential and transmission cases tends to become full of dirt and sludge or the like after a certain length of time, covering the gears and interfering with proper lubrication thereof. This is particularly true of some of the unstable lubricants employed at the present time in hypoid type differentials.

In order to insure adequate lubrication of such gears it is necessary to remove the old grease from the gear cases periodically and refill the cases with fresh grease. However, if proper lubrication is to be obtained not only must the old grease be removed but the dirt and sludge in the case and clinging to the gears must be thoroughly washed out before the fresh grease is put in. The present invention relates to a flusher for washing out accumulated sludge and dirt in gear cases and has for one of its objects to provide a device which will thoroughly clean out a gear case quickly and with a minimum amount of manipulation.

Another object of the invention is to provide a gear case flusher which operates to drain the old grease and to wash out the gear case thoroughly. An important feature relates to control of the several operations by a single valve operable to vary the connections to obtain the desired functions.

Another object of the invention is to provide a gear case flusher including a heating device to heat flushing liquid circulated through the gear case. This enables any coagulated deposits to be melted and insures removal of all grease from the gear case regardless of the outside temperature.

Still another object relates to the arrangement of the heater, pump and valve to provide a subassembly which can readily be placed in a casing. According to one important feature the heater contains a strainer which can be removed for cleaning without removing the heater assembly from the casing. Preferably the casing also carries supply and waste tanks to contain a supply of flushing liquid and to receive drainings.

Still another object of the invention is to provide a novel tube or conduit arrangement for a flusher to accommodate gear cases of different sizes and to insure cleaning of all parts of the case. Preferably a splash plate is secured to the tubes outside of the gear case to prevent oil or grease from being splashed on an operator.

Other objects and advantages of the invention including novel sub-combinations and desirable structural features will be apparent from the following description of the accompanying drawings, in which:

Figure 1 is a vertical section just inside the front cover of a gear flusher embodying the invention;

Figure 2 is a section substantially on the line 2—2 of Figure 1;

Figure 3 is an exploded perspective of the heating chamber;

Figure 4 is a central section through the valve with parts in elevation;

Figure 5 is a front view of the valve handle and indicator plate;

Figure 6 is a front view of the valve disc;

Figure 7 is a side view of the valve disc;

Figure 8 is a partial section showing the discharge and intake end of the hoses;

Figure 9 is a section on the line 9—9 of Figure 8; and

Figure 10 is a view illustrating a manner of use of the gear flusher.

As shown in Figure 10, the gear flusher of the present invention includes an outer casing 12 substantially rectangular in shape and having on its front face a control handle 14 and a pair of switches 15 and 16 for the motor and heater respectively. A transverse carrying handle 18 is provided on the casing 12 by which it may readily be moved from place to place and a pair of hooks 20 are pivoted on the ends of the handle 18 for suspending it from a gear casing to be flushed. As shown, the hooks are connected to a rear axle housing indicated at 22 and suitable hoses 24 extend from the flusher through the filler opening of the axle housing.

As illustrated more particularly in Figure 1, the casing 12 is formed with a top 26 sloping downwardly at one side and connected to a vertical drain pipe 28 leading into a waste tank 30 at the lower part of the casing. A suitable drain opening 32 is provided at the lower part of the waste tank for removal of waste products therefrom. Above the waste tank and at one side of the casing, an assembly 34 including heater pump and valve elements is mounted, a motor 36 at the other side of the casing driving the pump through a belt 38. A supply tank 40 having a top filling opening 42 is secured in the casing above the motor and is adapted to contain a supply of flushing liquid.

The assembly 34 is made up of three relatively flat rectangular plates 44, 46, and 48. Preferably the intermediate plate 46 is fixedly secured to the casing 12 by brackets 50 in register with a rectangular opening in the back of the casing through which the plate 44 may be passed. Thus the plate 44 may easily be removed without disturbing the rest of the assembly.

As shown in Figure 3, the plate 44 is hollowed out on one side and is formed with a plurality of projecting pins 52 substantially flush with its inner surface and with a passage 54 extending around two sides thereof. The passage 54 is defined by an upstanding wall portion 56 spaced from the edge of the plate 44 and interrupted adjacent the narrow end of the plate to provide communication between the passage 54 and the central cavity of the plate.

The plate 46 is formed with a passage 58 adapted to register with the passage 54 and with a plurality of oppositely-extending partitions 60 providing a tortuous passage. The partitions 60 are of less height than the cavity in the plate 46 so that their upper surfaces lie below the inner surface of the plate. A baffle 61 is adapted to be secured to the tops of partitions 60 and terminates substantially at the uppermost partitions to leave a fluid outlet from the top of the tortuous passage, the outer surface of the baffle lying below the inner surface of the plate. One end of the passage 58 is connected to a socket 62 and a second socket 64 communicates with one end of the tortuous passage formed by the partitions 60. The plates 44 and 46 are adapted to be assembled with the cavities therein faced and with a screen 66 between them and spaced from the baffle 61 to act as a strainer for large particles. When the plates are assembled liquid is adapted to enter through the socket 64 and flow through the tortuous passage defined by the partitions 60 and over the top of baffle 61 into the space between the baffle and screen. In flowing through the screen any large particles are screened out of the liquid which flows into the space around the pins 52, which support the screen, and through the gap in partition 56 into the passage 54. Liquid entering the passage 54 may readily flow back into the passage 58 and out through the socket 62.

The plate 48 forms a valve casing and is provided with a substantially cylindrical cavity 68 having a passage 70 connected to one side thereof terminating in an opening 72 at the surface of the plate. The plate 48 is assembled with its smooth back surface facing the smooth outer surface of the plate 46 and an electrical heating element indicated at 74 (Figure 2) is arranged between them. This element is preferably a conventional heating element such as a flat plate of mica or the like wound with flat resistance wires so as to make up a small space between the plates. Preferably a thermostat (not shown) is arranged between the plates 46 and 48 to shut off the heating elements when its temperature reaches a predetermined value.

A valve disc 76 is mounted in the cavity 68 and is formed with a plurality of passages best seen in Figure 6. As shown in that figure the valve disc has a pair of elongated openings 78 and 79 adjacent its periphery and a pair of radially-spaced substantially round openings 80 between the openings 78 and 79. At one side the disc is formed with an enlarged cavity 82 open at the one surface of the valve and closed at the other. The line 84 in Figure 6 indicates the center line of the handle 14 which is secured to the valve disc 76 by a rod 86. A cover plate 88 is secured over the valve cavity 68 and is formed with a flat surface fitting against the flat surface of the valve disc 76. The disc is initially held against the surface of the cover plate by the rod 86 and is pressed tightly thereagainst by pump pressure and the openings and cavity in the valve disc are adapted to register selectively with a series of ports in the cover plate 88 as the disc is turned. As best seen in Figure 1, the cover plate is formed with a port 90 connected to the drain pipe 28 with a port 92 connected to the supply tank 40 and with a port 94 connected to the socket 64. A port 96 adjacent the valve port 90 is connected to a hose 98 and two spaced ports 99 and 100 are connected respectively to hoses 102 and 104, the hose 104 being arranged inside the hose 102.

Liquid is circulated through the flusher by a gear pump 106 mounted on the valve plate 48 with its inlet opening connected to the socket 62 and its outlet opening communicating with the port 72 (Fig. 4). The pump is provided with a pulley 108 to receive the driving belt 38 by which it is driven.

The coaxial hoses 102 and 104 terminate in flexible end portions extending through a side opening in a handle 110 which is secured to the end of the hose 98. As shown in Figures 8 and 9 the end portion of the hose 98 is flattened to fit over the hose 102 and is formed at its end with a pair of spray slots 112 through which flushing liquid may be sprayed. As seen in Figure 8 the lower wall of the hose 98 is pressed upwardly to define a relatively narrow slot between the end of the upper wall and the upwardly-pressed portion of the lower wall and the second slot is formed by a saw cut or the like in the upper part of the hose. The hoses 102 and 104 are slidable in the handle 110 and are preferably yieldingly held in place by a spring 114 pressing thereagainst. The spring is tight enough to hold the hoses against accidental slipping but loose enough to permit slipping when force is applied to the hoses. At its outer end the handle 110 carries a splash plate 116 adapted to overlie the filler opening in a gear casing such as indicated at 118 to prevent splashing of liquid from the gear casing on to an operator.

In use the flusher may be suspended from a gear casing as indicated in Figure 10 with the hoses projecting into the casing as shown in Figure 8. The hoses 102 and 104 are preferably adjusted in the handle 110 so that their open ends will extend to the bottom of the gear case when the handle is substantially in the position shown. The gear case may be emptied by starting the motor and moving the handle 14 to the position marked Drain in Figure 5. At this time the ports 99 and 100 communicate with the port 94 through the cavity 82 and the port 90 communicates with the valve chamber 68 through the port 79. Thus with the pump running, liquid will be sucked in through both passages 102 and 104 through the valve cavity 82 to port 94 through the socket 64 into the passage in the plate 46 through the screen 66 and out the socket 62 to the pump inlet. The pump forces the liquid through the port 72 and passage 70 into the valve cavity 68 and through the opening 79 to pipe 90 and thence to the drain pipe 28 and the waste tank 30.

When the liquid is all sucked out of the gear case the handle 14 may be moved to the Add position as indicated in Figure 5 to connect the ports 92 and 94 through the valve cavity 82 and to bring the openings 80 into register with the ports 99 and 100. In this position liquid will be sucked from the supply tank 40 through port 92, cavity 82, port 94, socket 64 and through the heater casing to port 62 and the pump inlet. Liquid forced by the pump into the valve cavity 68 will flow through the openings 80, ports 99 and 100 and hoses 102 and 104 into the gear casing to fill it with flushing liquid.

It sometimes happens as in extremely cold weather that a certain amount of grease becomes coagulated or "frozen" in the bottom of the gear case and in order to melt this material out the handle 14 may be turned to the "Thaw" position as indicated in Figure 5. In this position ports 94 and 100 communicate through the valve cavity 82 and port 99 is in register with the opening 78. With the heater turned on the pump running flushing liquid will be sucked from the gear case through hose 104, port 100, valve cavity 82, port 94 and socket 64 into the heater. Due to the elongated passage provided through the heater by the partitions 60 the flushing liquid will be heated to a high temperature and will flow through socket 62 into pump 106 and out through the valve casing and opening 78 and port 99 through hose 102. Since the hose 102 is outside of the hose 104, the portion in contact with the coagulated material in the gear case will be the hottest part of the hose and will tend to melt its way through the deposits in the bottom of the gear case. It has been found that even in extremely low temperatures the hose will rapidly melt its way to the bottom of the gear case so that all of the material will be removed therefrom.

To wash the gear case and the gears contained therein, the handle 14 is moved to the Wash position as indicated in Figure 5 to connect both ports 99 and 100 to the port 94, through the cavity 82 and to bring the opening 78 into register with the port 96. In this position flushing liquid will be sucked from the gear case through both hoses 102 and 104 through cavity 82 to port 94 and through the heater to the pump inlet. Liquid leaving the pump under pressure flows through the valve cavity 68, opening 78, port 96 and hose 98 to the gear casing. As the liquid passes from the hose 98 through the slots 112 it will be broken up into fan-shaped sprays covering the tops and sides of the gear casing and its contents to wash all accumulations of grease and dirt therefrom. The flushing liquid is preferably heated during this operation to facilitate removal of grease so that the gears and the entire gear casing will be thoroughly cleaned.

After a few minutes of operation in the washing position, the handle 14 may again be moved to the drain position to suck the flushing liquid from the gear case. The gear case is now thoroughly cleaned and may be refilled with any suitable lubricant.

During the operation as described above, any large particles which cannot be melted will be strained out by the screen 66 during passage of the liquid through the heater. After the screen becomes dirty, it may readily be cleaned by removing the plate 44 through the opening in the outer casing 12 at which time the screen can be removed for cleaning and any accumulation of dirt in the heating chamber can readily be washed out. This operation does not necessitate removal of any parts other than plate 44 and can readily be performed in a few minutes.

While one embodiment of the invention has been shown and described in detail, it will be understood that various changes might be made therein and it is not intended to limit the scope of the invention to the exact form shown, or otherwise than by the terms of the appended claims.

What is claimed is:

1. A gear case flusher comprising a pair of conduits adapted to extend into a gear case, a pump, a waste pipe, a source of supply of liquid, a valve casing communicating with the pump and having a plurality of ports communicating respectively with said conduits, said pipe and said source, and a valve member in said casing movable to a plurality of positions selectively to connect (1) the pump inlet to one of said conduits and the pump outlet to said waste pipe, (2) the pump inlet to said source and the pump outlet to one of said conduits, or (3) the pump inlet to one of said conduits and the pump outlet to the other of said conduits.

2. A gear case flusher comprising a pair of conduits adapted to extend into a gear case, a pump, a heater having a passage therethrough communicating with the pump, a waste pipe, a source of supply of liquid, a valve casing communicating with the pump and having a plurality of ports communicating respectively with said conduits, said pipe, said heater and said source, and a valve member in said casing movable to a plurality of positions selectively to connect (1) the heater to one of said conduits and the pump outlet to said waste pipe, (2) the heater to said source and the pump outlet to one of said conduits, or (3) the heater to one of said conduits and the pump outlet to the other of said conduits.

3. A gear case flusher comprising three conduits adapted to extend into a gear case, one of said conduits terminating in a spray nozzle, a pump, a valve casing communicating with the pump and having three ports connected respectively to said conduits, and a valve member in said casing movable to a plurality of positions selectively to connect said one conduit to the pump outlet and the other conduits to the pump inlet, or said other conduits respectively to the pump inlet and outlet.

4. A gear case flusher comprising three conduits adapted to extend into a gear case, one of said conduits terminating in a spray nozzle, a pump, a waste pipe, a source of supply of liquid, a valve casing communicating with the pump and having a plurality of ports connected respectively to the conduits, the waste pipe and the source, and a valve member in said casing movable to a plurality of positions respectively to connect (1) the two other of said conduits to the pump inlet and the pump outlet to said waste pipe, (2) the pump inlet to said source and the pump outlet to one of said conduits (3) the pump inlet and outlet to said two other conduits respectively, or (4) the pump outlet to said one conduit and the pump inlet to another of the conduits.

5. A gear case flusher comprising three conduits adapted to extend into a gear case, one of said conduits terminating in a spray nozzle, a pump, a heater having a passage therethrough in series with the pump, a waste pipe, a source of supply of liquid, a valve casing communicating with the pump and having a plurality of ports connected respectively to the conduits, the waste pipe and the source, and a valve member in said casing movable to a plurality of positions respectively to connect (1) the two other of said conduits to the pump inlet and the pump outlet to said waste pipe, (2) the pump inlet to said source and the pump outlet to one of said conduits, (3) the pump inlet and outlet to said two other conduits respectively, or (4) the pump outlet to said one conduit and the pump inlet to another of the conduits.

6. A gear case flusher comprising a valve body having a valve cavity therein, a cover for said cavity having a flat surface formed with a plurality of ports, a valve disc in said cavity having a flat surface engaging the flat surface of said cover and formed with a plurality of openings adapted to register with different ones of said ports in different positions of the valve disc, an operating rod for said disc extending through the cover, a hollow flat casing secured to said valve body and having a flow passage therethrough, a heater element connected to said casing to heat liquid flowing therethrough, and a pump mounted on said valve body and connected to said casing and the valve cavity.

7. A gear case flusher comprising a valve body having a valve cavity therein, a cover for said cavity having a flat surface formed with a plurality of ports, a valve disc in said cavity having a flat surface engaging the flat surface of said cover and formed with a plurality of openings adapted to register with different ones of said ports in different positions of the valve disc, an operating rod for said disc extending through the cover, a hollow flat casing secured to the back of said valve body and having a flow passage therethrough, a flat heating element between the casing and body to heat liquid flowing therethrough, and a pump mounted on said body and connected to the casing and the valve cavity.

8. A gear case flusher comprising three flat body members each formed with a cavity in its face and a flat back, two of said members being secured together face to face to form a heater casing and the third member being secured back to back to one of the other members, the cavity in said third member forming a valve cavity, a valve disc in said valve cavity and a cover therefor having ports adapted to register with ports in the valve disc, and a pump having its inlet and outlet connected respectively to the heater casing and the valve cavity.

9. A gear case flusher comprising three flat body members each formed with a cavity in its face and a flat back, two of said members being secured together face to face to form a heater casing and the third member being secured back to back to one of the other members, the cavity in said third member forming a valve cavity, a valve disc in said valve cavity and a cover therefor having ports adapted to register with ports in the valve disc, means in said two members forming an elongated passage through the heater casing, a strainer in said heater casing, a heating element between the third member and said one of the other members, and a pump connected in series to the heater casing and the valve cavity.

10. A gear case flusher comprising a casing having an opening in one side, a flat body member secured in said casing in register with the opening and having a cavity therein facing the opening, a second flat body member secured to the first named body member to close the cavity therein, a strainer in said cavity, said second body member being removable through said opening to permit cleaning of the strainer, and a pump to circulate liquid through said cavity and said strainer.

11. A gear case flusher comprising a casing having an opening in one side, a flat body member secured in said casing in register with the opening and having a cavity therein facing the opening, a second flat body member secured to the first named body member to close the cavity therein, a strainer in said cavity, said second body member being removable through said opening to permit cleaning of the strainer, a valve body secured to said first named body member, a heating element between the valve body and the first named body member, and a pump connected in series with the valve body and said cavity to circulate liquid therethrough.

12. A gear case flusher comprising a pair of substantially coaxial tubes adapted to extend into a gear case, a pump having its inlet connected to the inner tube and its outlet connected to the outer tube, and heating means in series with the pump and tubes to heat liquid circulated therethrough, said outer tube being heated to a relatively high temperature by the heated liquid whereby it will tend to melt its way through grease or the like accumulated in the gear case.

13. A gear case flusher comprising a tube adapted to extend into a gear case, a second tube having a concave wall portion to fit partially around said first tube, said second tube terminating in a nozzle adapted to extend into the gear case, and means to circulate liquid through said tubes.

14. A gear case flusher comprising a tube adapted to extend into a gear case, a second tube having a concave wall portion to fit partially around said first tube, said second tube terminating in a nozzle adapted to extend into the gear case, a handle member secured to said second tube and having an opening slidably receiving the first named tube, and means to circulate liquid through said tubes.

GEORGE O. TAYLOR.
ERNEST V. BUNTING.